United States Patent [19]

Felegi, Jr. et al.

[11] Patent Number: 5,277,762

[45] Date of Patent: Jan. 11, 1994

[54] COMPOSITE FIBERBOARD AND PROCESS OF MANUFACTURE

[75] Inventors: John Felegi, Jr.; Kenneth P. Kehrer; Edward E. Wise, Jr., all of lancaster, Pa.

[73] Assignee: Armstrong World Industries, Inc., Lancaster, Pa.

[21] Appl. No.: 873,977

[22] Filed: Apr. 24, 1992

Related U.S. Application Data

[63] Continuation of Ser. No. 691,991, Apr. 26, 1991, abandoned.

[51] Int. Cl.$^5$ .............................................. D21H 13/40
[52] U.S. Cl. .................................. 162/145; 162/169; 162/181.8; 162/208; 162/212; 162/216
[58] Field of Search ............... 162/145, 152, 169, 175, 162/212, 216, 208, 181.6, 181.8

[56] References Cited

U.S. PATENT DOCUMENTS

| | | | |
|---|---|---|---|
| 3,006,805 | 10/1961 | Waggoner | 162/145 |
| 3,573,158 | 3/1971 | Pall et al. | 162/208 |
| 4,925,529 | 5/1990 | Dotzauer et al. | 162/152 |
| 4,963,603 | 10/1990 | Felegi et al. | 162/145 |

*Primary Examiner*—Peter Chin

[57] ABSTRACT

A novel composite board of mineral wool, perlite, and cellulosic newsprint fibers for use as an acoustical tile is disclosed. The board displays a high porosity, a fine pore structure, a low density gradient through its thickness and an acceptable strength. The board is manufactured by a process that includes a flotation step prior to the final formation step.

9 Claims, 1 Drawing Sheet

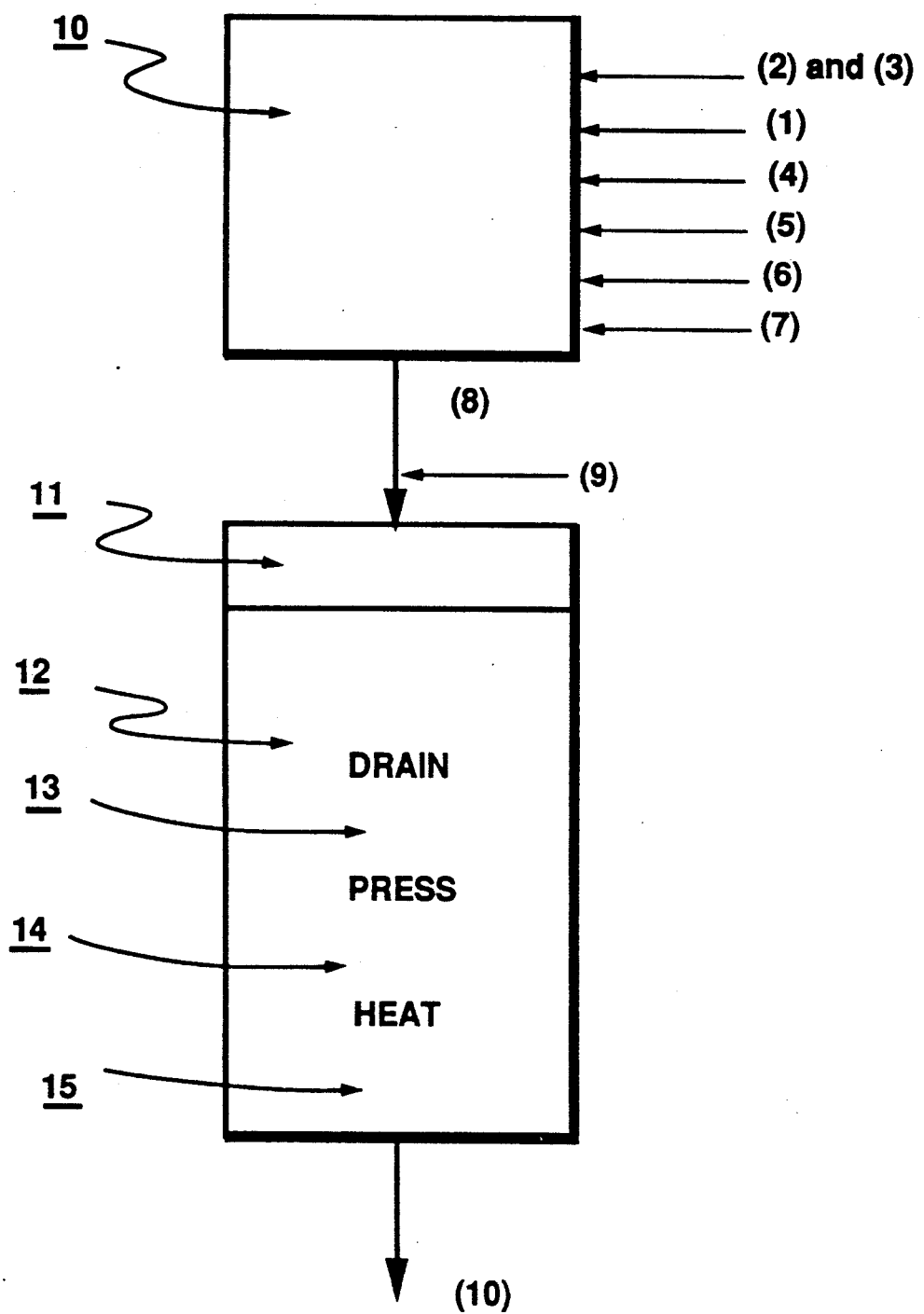

COMPOSITE FIBERBOARD AND PROCESS OF MANUFACTURE

This application is a continuation of application Ser. No. 691,991, filed Apr. 26, 1991, abandoned.

This invention relates to a novel composite fiberboard of improved moisture resistance and improved acoustical properties for use as a ceiling or wall tile and its process of manufacture.

BACKGROUND

1. Field of the Invention

The conventional composite fiberboards, typical of those used for acoustical ceilings, are composed of mineral wool, perlite and newsprint as the main ingredients, newsprint being primarily cellulosic fibers. These materials are formed into boards from aqueous slurries using an organic binder such as starch.

The mineral wool may be composed of fibers of rock wool or basalt wool. It is also possible to use glass fibers, alone, or mixed with the mineral wool. The fibers, in general, have a diameter of 3 to 6 microns. The fibers may be used in the "sized" or "naked" state. Sizing agents such as mineral oils or acrylic polymer dispersions may be employed. These fibers contribute to the structural integrity and strength of the board.

The perlite is a volcanic glass ore composed of aluminum, calcium or other alkaline earth silicate. Prior to use in the fiberboard process, the perlite ore is expanded at high temperatures to obtain densities of 2 to 10 pounds/cubic foot (pcf), preferably 3 to 7 pcf. Perlite contributes to the bulk and hardness of the board. The perlite may also be coated with hydrophobic coatings such as silicones, sizing agents and the like.

The third important ingredient is the so-called "newsprint". Specifically, the newsprint is composed of cellulosic fibers. These fibers contribute to the wet strength of the board as it is converted from the slurry to the substantially solid cake enroute to becoming the board. Hereinafter, these fibers will be referred to as "cellulosic newsprint" fibers.

The mixture may also contain fillers, flame-proofing agents, pigments, water repellants, etc. The fillers employed are usually finely divided clays, e.g., kaolin, ball clay, etc.

In the process of preparing the board, the ingredients are mixed together with the amount of water necessary to provide slurry consistency in conventional mixing and holding equipment. Additional water and "dry broke" may be added to the slurry prior to the addition of the starch binder. The starch is employed in amounts as high as about 15%, based on the three primary ingredients. The "dry broke" is predominately recycled board material that may have been rejected or cut from the commercially acceptable boards, as well as other waste products.

The slurry containing less than 5% solids is pumped to a head box and, immediately thereafter, dewatered by being transferred onto the board forming wire of a Fourdrinier. Suction is usually applied, sometimes along with pressure, to assist in drainage and compaction using conventional means.

One disadvantage of these conventional sound-insulating boards made using starch a the binder is their moisture sensitivity. Their tendency to sag in a moist atmosphere may make it necessary to coat or impregnate the back and/or face of the boards with, for example, thermosetting plastics or other moisture-resistant compositions. Not only does this add the extra coating step, but further drying and heating becomes necessary. In short, a more expensive board results.

Overcoming the sag resistance problem by substituting latex compositions for the starch binders as set forth in U.S. Pat. Nos. 4,863,979 and 4,963,603, and using the above-described conventional process involving the Fourdrinier and the conventional head-box does not provide particularly high acoustical properties in the ultimate composite board.

Producing a highly acoustical composite board (a board that will contribute to a substantial reduction in the noise level), currently relies upon the use of man-made fibers (fiberglass, mineral wool, etc.) as the predominant component in the board. The resulting board is highly porous consisting of a large number of small pores. The man-made fibers tend to be more resistant to compression during the free drainage and vacuum sections of the Fourdrinier and the cylinder machines that are sometimes used. Therefore, the fine pore structure remains intact to provide the board with its acoustical properties. However, this method, whether or not it utilizes a significant amount of man-made fibers, results in a wet mat that has a significant density gradient face to back and, subsequently, poor felting on the face and tight felting on the back.

Increased board thickness also tends to improve acoustical properties; the thickness being increased by increasing the mass of the board. However, thicker boards require more stock per square foot and, obviously, are more expensive.

One of the objects of this invention is to produce highly acoustical boards that are less expensive and which use relatively low percentages of man-made fibers and relatively high percentages of cellulose (newsprint) and perlite.

2. Description of the Prior Art

In U.S. Pat. No. 4,587,278, sound-insulating boards which are based on mineral fibers and thermoplastic binders are disclosed to overcome the moisture-sensitive disadvantages of the starch-bound board. The binders disclosed in this patent are polymers having glass transition temperatures from 38° to 80° C. These binders may be inadequate for the boards to retain dimensional stability without any substantial sag when exposed for prolonged periods at high temperatures with high humidity.

In U.S. Pat. No. 4,863,979, the applicant discloses the use of thermoplastic binders (latex compositions) having glass transition temperatures anywhere from 35° C. to 115° C. The boards disclosed contain newsprint, perlite, mineral wool and clay as well as the latex binder. They are manufactured by incorporating the latex binder into a previously prepared aqueous slurry of the other ingredients. The resulting boards, according to the disclosure, display acceptable strength and an improvement in "dimensional stability" as measured by the composite board's sag resistance.

U.S. Pat. No. 4,963,603 discloses a process for minimizing the amount of thermoplastic polymeric latex binder required to provide a commercially attractive composite board containing cellulosic newsprint along with mineral wool and perlite. The board displays acceptable strength and an unexpectedly high dimensional stability. The crux of the invented process is in selectively depositing the latex binder onto the cellulosic fibers prior to binding all of the board's components to form the ultimate board.

An object of this invention is to provide a composite board of mineral wool, perlite and 4-35% by weight of cellulosic newsprint fibers that displays low sag (less than 0.2 inches or 200 mils) when a 9×24 inch board, 0.6 inch thick, (the base board being sanded on the face and/or back) is supported at each end to form a 23 inch span and exposed to a temperature of 85° F. and a relative humidity of 95% for 24 hours, a relatively low density gradient from face to back, i.e., no greater than 0.05 psf from face to back, and improved acoustical properties, i.e., a noise reduction coefficient (NRC) as measured by ASTM test designation C423-84a on the face and/or back of the base board, of at least about 0.60, preferably at least about 0.725.

Another object is to provide a process for manufacturing a composite board displaying minimal sag and excellent acoustical properties.

SUMMARY OF THE INVENTION

The objects are accomplished by allowing the low solids slurry that is pumped from the mixing tank into an initial forming zone (IFZ), i.e., the head box in a continuous process or the mold in a batch process, a period of quiescence in the IFZ before it is transferred to the final forming zone (FFZ), i.e., onto the board-forming wire of the Fourdrinier or onto similar draining and compaction equipment. It has been found that a period of quiescence of at least about 10 seconds will permit flotation of the slurry solids resulting in a surprisingly low front-to-back density gradient of the board and an excellent improvement in its acoustical properties. A quiescent period of more than about 60 seconds provides little further improvement in the board.

It is believed that the period of quiescence in the IFZ or head box provides time for the extended fibrils of the cellulose fibers to retain perlite particles. The forrmation of the wet mat then occurs with very little, if any, gravity effect; thus, creating a substantially uniformly formed board face to back, with high bulk or loft.

The minimum quiescent period will depend upon whether the process is a batch or continuous process. In the batch process, the flow is usually from the top into the mold and at least about 10 seconds of quiescence is required for improved results. When the flow is from the bottom, as in most continuous processes, the minimum "quiescent" period in the IFZ (where the board is initially formed and very little, if any, outward flow occurs) will depend upon the depth of the zone. In the contemplated process, where the slurry is first prepared to contain about 1.5-3% solids, where the solids content decreases to about 0.75-1.5% in the IFZ and where the solids content rises to about 4-5% upon entry into the FFZ, a quiescent period of at least about 20 seconds is preferred.

The composite board produced by the process (batch or continuous) of this invention comprises up to about 87%, preferably less than 45%, most preferably less than 20%, by weight mineral wool; 5-85%, preferably 40-75% by weight perlite; 0-25% by weight clay; 4-35% by weight cellulosic newsprint composed primarily of cellulosic fibers and 2-15% by weight of a binder composition comprising at least one thermoplastic polymer having a glass transition temperature of 80° C. to 115° C., wherein the cellulose fibers in the board are substantially coated with said binder composition, the density profile difference from face to back of said board being no greater than about 0.05 pound per board foot (pbf), the noise resistance coefficient (NRC) of said board being at least about 0.60, preferably at least about 0.70.

Acoustical properties (sound absorption) of ceiling boards is based upon sound entering the board through its pores and while in the board the sound energy is converted into thermal and mechanical energy. The natural resonating properties of the board materials convert sound to mechanical energy. The walls of the pores in the board convert sound to thermal energy via friction. Standard board formation techniques (Fourdrinier or cylinder) using high cellulosic fibers (newsprint) and perlite levels will produce a board that, although having sufficient total porosity so as not to hinder sound flow completely, will have large pores at the face and smaller pores at the back. This disposition of pores in the board does not absorb nor convert sound energy efficiently. The large pores on the face do not have enough wall surface area to convert sound to thermal energy and the small pores on the back do not have sufficient cross-sectional area to enable sound to enter the pores. Therefore, although the overall porosity of the board may be relatively high (85%-90%), substantially less than all of the pores have the appropriate ratio of pore cross-sectional area to pore surface area to permit sound flow into the pores in conjunction with sound absorption within the pores. However, the float formation process of this invention produces a homogeneous board structure such that substantially all of the pores of the board are available for both sound flow and sound absorption.

Thus, the highly acoustical properties of the board of this invention are attributable to its high porosity and its substantially uniform density face-to-back, i.e., a well-controlled density gradient. Formulations that contain high amounts of man-made fiber usually exhibit high porosity with accompanying acoustical properties. Using current board forming techniques, formulations containing high amounts of mineral wool will display high NRC's, i.e., above 60. Formulations that contain significant amounts of cellulose and of perlite normally do not exhibit such high NRC's. It is believed that the newsprint fibers tend to collapse and the perlite tends to separate from the fibers and float to the surface. However, the process of this invention is believed to prevent the newsprint fibers from collapsing and, thus, maintains uniform composition and uniform density from face to back of the board. This contributes to a significantly higher porosity and accompanying high NRC's. By floating the head box slurry solids, i.e., in the IFZ, prior to draining the water, the fibers are free from the effect of gravity. They form uniformly face-to-back resulting in the even distribution of pore sizes. The floated mat structure remains set prior to free-drainage and vacuum removal of the water.

The characteristic of flotation is dependent upon the amount of perlite in the formulation. The mechanical and chemical entrapment (using a flocculant) of the perlite results in the flotation of the total slurry and the uniform distribution of components face to back. The mechanical entrapment of the perlite is due primarily to the newsprint fibrils. In lieu of, or in addition to, the use of perlite to float the slurry solids, entrained air may also be injected into the slurry.

The preparation of the components is substantially the same as those techniques standard in the industry.

The process of floating the slurry solids requires, first, the addition of a flocculant as a retention and drainage aid under sufficient agitation and, then, a period of quiescence whereby the slurry is given time to float. After anywhere from approximately 10 seconds to 60 seconds, the water under the floated mat is allowed to drain or the floated mat is mechanically separated from the water. The mat then undergoes the processing that is standard in the industry: free drainage, pressing, vacuum removal of water, drying and fabricating.

BRIEF DESCRIPTION OF THE DRAWINGS AND THE BEST MODE

The invention will be more clearly understood by referring to the drawing and the description of the best mode for carrying out the invention that follows.

FIG. 1 represents a flow sheet of the preferred method at this time for carrying out the process of the invention.

In the most preferred situation, as shown in FIG. 1, the coagulant (2), a poly (diallyldimethyl-ammonium) chloride [DADMAC] having an average molecular weight of about 200,000 and a charge density of 6.2 milliequivalents/gram, is added to a portion of the total latex binder composition (3). Specifically, an anionic latex emulsion prepared from styrene, methyl methacrylate, and ethyl acrylate, as described, in general, in U.S. Pat. No. 4,963,603, may be used as the latex. The Tg of the copolymer is about 100°C. Anywhere from 10% to 100%, preferably 10% to 50%, of the total latex composition to be added, is added at this step. This combination is added to a previously prepared aqueous dispersion of the cellulosic newsprint fibers (1) under agitation in the mixer 10. The fiber dispersion is composed of about 2-7% by weight of the fibers. It should be understood that starch, as commonly used in the industry, may also be used as the binder, although the latex binders are preferred.

It should be understood that the amounts of coagulant, binder and any extender used that might be used in accordance with the disclosure in copending U.S. patent application Ser. No. 590,772, which is incorporated herein by reference, will depend upon the amount of cellulose fibers present. The amounts are interrelated and may be engineered to optimize the coating effect of the latex composition on the cellulosic fibers. Preferably, the remaining portion of this latex composition is added with agitation at this point.

In the next step, any mineral wool (4) that might be used is added and the mixture is further agitated. Thereafter, additional coagulant and pure latex (5) may be added either prior or subsequent to the addition of the perlite (6) and the "dry broke" (7) while agitation continues in the mixing tank. If coarse clay is used in the composition, it may be used as an extender in the latex composition or it is added as a dispersion with agitation in the final step.

The resultant slurry (8) containing about 1.5-3% solids is pumped into a conventional forming mold 11 (the IFZ) having a removable solid plate (not shown) at the bottom surface of the mold. A flocculant (9), a cationic acrylamide polymer of extremely high molecular weight, e.g., 2,000,000-10,000,000 and having a charge density of 0.1-3 milliequivalents/gram is added to the slurry just prior to its entry into the mold 11. The ingredients used in forming the slurry, based on percent by weight of solids, include about 4-35% cellulosic newsprint fibers, up to about 45% mineral wool, 40-75% perlite, and 4-15% of the latex composition. About 2-8% coagulant (based on the weight of the selectively deposited latex composition) is used.

The flocculated slurry is retained in the mold 11 for a minimum of about 10 seconds before the plate is removed and the slurry is transferred from the mold 11 to drain at 13 on the moving wire belt 12 of the Fourdrinier. This is followed by the application of pressure at 14 and heat at 15 on to dry the material in the form of a board (10).

The composite board, after the wet-forming process and subsequent drying, is sanded to a specific gauge. The face of the composite board can be decorated using various methods: fissuring, routing, embossing, etching, painting (face and/or back), or any combination thereof, to produce the finished product. Some of these products are shown in Sweet's General Building Files, Catalog Code 09500/ARO.

A sanded board thickness of about 0.925" is usually achieved by the process of this invention at relatively low densities of 0.6 to 0.7 pbf. However, thicknesses of at least 0.5 inch may be produced. The improvements of this invention are most apparent in boards having thicknesses of about 0.75-2.5 inches, preferably 0.75-1.25 inches.

Since the flotation rate seems to be dependent upon the amount of perlite in the formulation, it is possible to combine formulations of varying flotation rates to produce a board structure with specifically engineered compositions and density gradients face to back.

As stated previously, the binder used in this invention can be either starch, as commonly used in the industry, or latex as described in U.S. Pat. No. 4,963,603 or U.S. patent application Ser. No. 590,772. The preferred binder is latex: its method of incorporating it into the raw material preparation process is detailed in the aforementioned patent and patent application. The use of latex will improve the drying of thick boards and will improve sag performance. The examples summarized in the next section of this specification are low in mineral wool and density, thereby reducing the board cost. The thickness has been maintained in the examples at approximately 0.850"-0.950".

It should be understood that other conventional processes (other than the use of a Fourdrinier) may be used to prepare the products. Thus, wet forming on a cylinder machine or a cast molded process could also produce the products.

An anionic dispersion of a copolymer of styrene, methyl methacrylate and ethyl acrylate has been shown in the latex composition of the preferred embodiment. However, it should be understood that any copolymer, usually having a substantial amount of styrene, sometimes as high as 100% as in polystyrene, but having a Tg of 80° C.-115° C. or higher, may be used, preferably a Tg of 100° C. or higher. The latex composition will typically include from 50 to 100 weight percent of the hard monomer, e.g., styrene, methyl methacrylate (whose homopolymer has a Tg of at least 80° C.) and up to 50 weight percent of a soft monomer, e.g., butadiene, ethyl acrylate, butyl acrylate (whose homopolymer has a Tg of less than 35° C.). Preferably, the hard monomer is present in an amount from 65 to 100 weight percent and the soft monomer is present in an amount from 0 to 35 weight percent. An alpha-beta 3-ethylenically unsaturated carboxylic acid such as acrylic, methacrylic, fumaric, itaconic, aconitic, and various alpha, beta-substituted acrylic acids, may also be incorporated in the copolymer to the extent of up to 10 weight percent, based on the weight of the final polymer.

The preferred latex particle diameter is less than or equal to 0.120 micron as measured using Brookhaven Model BI-90 particle size analyzer. To prepare the latex for particle size measurement, 2-3 drops of latex is added to a 0.001 M KCl solution to make a 200-300 ppm latex sample which is then sonicated.

Coagulants useful in the invention may be organic, low molecular weight polymers which reverse the charge on the latex particles without aggregation. The mechanism involves adsorption onto the latex particle. The preferred coagulants for use in this invention are organic polymeric coagulants of low molecular weight (from about 10,000 up to about 1,000,000) and high charge (correspondingly, from about 8 down to about 3 milliequivalents/gram) which adsorb on the particle surfaces. Such coagulants are well known to those skilled in the art and include, inter alia, polyethyleneimines, polyamines, substituted polyamines, etc. The most preferred is poly(diallyldimethylammonium) chloride [DADMAC] whose molecular weight is between 10,000 and 1,000,000 and whose charge density is 6.2 milliequivalents/gram.

The flocculants useful in the invention are also polymeric. However, they are usually of much higher molecular weight than the coagulants and of lower charge density. Thus, molecular weights for the flocculants may vary from 2,000,000 to 10,000,000 and their charge densities, from 0.1 to 3 milliequivalents per gram. The flocculants may be cationic, anionic, or nonionic. The flocculants that are useful in this field include polyacrylamides, copolymers of acrylamide with substituted acrylates, polyethyleneimides, etc. The preferred flocculant is a cationic polyacrylamide.

The invention will be more easily understood by referring to the examples of the invention and the control examples that follow. In these examples, all the percentages are by weight unless otherwise specified.

The "sag" in mils, may be measured as in U.S. Pat. No. 4,963,603 on a 0.6 inch thick board (nominal ⅝ inch board) that was 9 inches wide and 24 inches long. While being supported at both ends to form a 23 inch span, the board is exposed to a temperature of 85° F. and a relative humidity of 95%. After 24 hours of exposure, the displacement of the center of the 24 inch long board is measured in mils.

The modulus of rupture (MOR) of the board is measured by the procedure given in ASTM D-1037. MOR is calculated as being equal to $3PL/2bd^2$ psi where:

P = peak force required to break the sample (lbs.)
L = span between the sample supports (inches)
b = width of the sample (inches)
d = thickness of the sample (inches)

MOR may be corrected for density variations by multiplying by $D^2$ where D = desired density/actual density.

The density of the board products set forth in the following examples are expressed in pounds per board foot (pbf), and is determined by weighing a sample board having dimensions of one foot square and a thickness of one inch. The density calculation for thinner or thicker boards is computed by dividing the weight of a one foot square board sample by the thickness of the board sample expressed in inches.

The acoustical properties of composite boards are measured directly as NRC, Noise Reduction Coefficient. This is a standard test method in accordance to ASTM test designation C423-84a whereby sound absorption is measured at various frequencies.

EXAMPLE 1

| Wool | 14.25% |
|---|---|
| Cellulose | 12.75% |
| Perlite | 42.00% |
| Latex, 1st | 3.00% |
| Latex, 2nd | 3.00% |
| Dry Broke | 25.00% |

1.18 kilograms of the BFG latex* was made cationic by mixing with a 1.08% solution of DADMAC coagulant that contained 82.6 grams of DADMAC coagulant. 4.90 kilograms of cellulose was added to 153.85 liters of water and pulped for 1 hour, and to this was added the cationic latex. The resultant slurry was mixed in the pulper for 1 minute. An additional 1.18 kilograms of latex was added and mixed for 1 minute.

* A styrene/acrylate latex having an average particle size of about 0.11 micron and a Tg of 103° F. manufactured by the B. F. Goodrich Co. as "HYCAR 26427".

9.64 kilograms of pulped dry broke was added to the latex/newsprint slurry in a mix tank. To this was added approximately 1500 liters of water and mixed for 1 minute.

To this was added 5.49 kilograms of mineral wool and 16.19 kilograms of 5 pcf (pound per cubic foot) perlite. Sufficient water was then added to achieve a total of 2574.2 liters of 1.5% slurry which was then mixed 10 minutes.

A high charge, high molecular weight polyacrylamide flocculant was then added to the slurry as it was pumped to a large (28⅜"×56½") mold that had 2" of water in the bottom. This mold had a removable bottom metal plate under which was a forming wire. When a total of 7⅞" of stock was added to the mold, the stock flow was stopped. The slurry was then allowed a 60 second quiescent period at which time the solids floated to the surface creating a mat 7" to 8" thick. The bottom plate was removed to allow the water under and within the mat to drain through the forming wire. This composite board, after further processing on a Fourdrinier machine (mechanical water removal and pressing) and subsequent drying was sanded and then NRC tested as a sanded, non-fabricated, board.

This board, at a 0.72 pbf density and a 0.925" thickness, had a NRC of 0.732. The MOR was 87 psi. The density profile face to back was 0.77 pbf (0.155"), 0.77 pbf (0.155"), 0.75 pbf (0.158"), 0.76 pbf (0.154"), 0.77 pbf (0.155"), 0.76 pbf (0.156").

EXAMPLE 2

| Wool | 15.20% |
|---|---|
| Cellulose | 13.60% |
| Perlite | 44.80% |
| Latex, 1st | 3.20% |
| Latex, 2nd | 3.20% |
| Dry Broke | 20.00% |

2.45 kilograms of the BFG latex used in Example 1 was made cationic by mixing with a 1.08% solution of DADMAC coagulant that contained 171.5 grams of DADMAC coagulant. 0.48 kilograms of cellulose was added to 208.18 liters of water and pulped for 1 hour, and to this was added the cationic latex. The resultant slurry was mixed in the pulper for 1 minute. An additional 2.45 kilograms of latex was added and mixed for 1 minute.

15.42 kilograms of pulped dry broke was added to the latex/newsprint slurry in a mix tank. To this was added approximately 2800 liters of water and mixed for 1 minute. To this was added 11.70 kilograms of mineral wool and 34.56 kilograms of 5 pcf (pound per cubic foot) perlite. Sufficient water was then added to achieve a total of 5138.9 liters of 1.5% slurry which was then mixed 10 minutes.

A high charge, high molecular weight polyacrylamide flocculant was then added to the slurry as it was pumped to a large (28⅞"×56½") mold that had 2" of water in the bottom. This mold had a removable bottom metal plate under which was a forming wire. When a total of 7 3/16" of stock was added to the mold, the stock flow was stopped. The slurry was then allowed a 60 second quiescent period at which time the solids floated to the surface creating a mat 7" to 8" thick. The bottom plate was removed to allow the water under and within the mat to drain through the forming wire. This composite board, after further processing on a Fourdrinier machine (mechanical water removal and pressing) and subsequent drying, was sanded and then NRC tested as a sanded, non-fabricated, board.

This board, at a 0.62 pbf density and a 0.980" thickness, had a NRC of 0.775. The MOR was 70 psi. The density profile face to back was 0.56 pbf (0.156"), 0.58 pbf 0.153"), 0.59 pbf (0.154"), 0.61 pbf (0.152"), 0.61 pbf (0.155"), 0.61 pbf (0.140"), 0.61 pbf (0.100").

EXAMPLE 3

| Wool | 15.20% |
| Cellulose | 13.60% |
| Perlite | 44.80% |
| Latex, 1st | 3.20% |
| Latex, 2nd | 3.20% |
| Dry Broke | 20.00% |

2.45 kilograms of the Example 1 BFG latex was made cationic by mixing with a 1.08% solution of DADMAC coagulant that contained 171.5 grams of DADMAC coagulant. 10.48 kilograms of cellulose was added to 208.18 liters of water and pulped for 1 hour, and to this was added the cationic latex. The resultant slurry was mixed in the pulper for 1 minute. An additional 2.45 kilograms of latex was added and mixed for 1 minute.

15.42 kilograms of pulped dry broke was added to the latex/newsprint slurry in a mix tank. To this was added approximately 2800 liters of water and mixed for 1 minute. To this was added 11.70 kilograms of mineral wool and 34.56 kilograms of 5 pcf (pound per cubic foot) perlite. Sufficient water was then added to achieve a total of 5138.9 liters of 1.5% slurry which was then mixed 10 minutes.

A high charge, high molecular weight polyacrylamide flocculant was then added to the slurry as it was pumped to a large (28⅞"×56½") mold that had 2" of water in the bottom. This mold had a removable bottom metal plate under which was a forming wire. When a total of 6½" of stock was added to the mold, the stock flow was stopped. The slurry was then allowed a 60 second quiescent period at which time the solids floated to the surface creating a mat 7" to 8" thick. The bottom plate was removed to allow the water under and within the mat to drain through the forming wire. This composite board, after further processing on a Fourdrinier machine (mechanical water removal and pressing) and subsequent drying, was sanded and then NRC tested as a sanded, non-fabricated, board.

This board, at a 0.58 pbf density and a 0.870" thickness, had a NRC OF 0.787. The MOR was 67 psi. The density profile face to back was 0.55 pbf (0.155"), 0.55 pbf (0.155"), 0.55 pbf (0.153"), 0.57 pbf (0.154"), 0.58 pbf (0.150"), 0.59 pbf (0.145"), 0.59 pbf (0.129").

CONTROL EXAMPLE A

| Wool | 15.20% |
| Cellulose | 13.60% |
| Perlite | 44.80% |
| Latex, 1st | 3.20% |
| Latex, 2nd | 3.20% |
| Dry Broke | 20.00% |

1.45 kilograms of the Example 1 BFG latex was made cationic by mixing with a 1.08% solution of DADMAC coagulant that contained 101.6 grams of DADMAC coagulant. 6.17 kilograms of cellulose was added to 153.05 liters of water and pulped for 1 hour, and to this was added the cationic minute. An additional 1.45 kilograms of latex was added and mixed for 1 minute.

9.07 kilograms of pulped dry broke was added to the latex/newsprint slurry in a mix tank. To this was added approximately 1300 liters of water and mixed for 1 minute. To this was added 6.89 kilograms of mineral wool and 20.32 kilograms of 3 pcf (pound per cubic foot) perlite. Sufficient water was then added to achieve a total of 1518.2 liters of 3.0% slurry which was then mixed 10 minutes. A high charge, high molecular weight polyacrylamide flocculant was then added to the slurry as it was pumped to the Fourdrinier. The resultant composite board was formed using conventional processes, dried, and sanded. It was then NRC tested as a sanded, non-fabricated, board.

This board, at a 0.57 pbf density and a 0.950" thickness, had a NRC OF 0.660. The MOR was 66 psi. The density profile face to back was 0.52 pbf (0.150"), 0.51 pbf (0.153"), 0.54 pbf (0.155"), 0.55 pbf (0.154"), 0.58 pbf (0.151"), 0.57 pbf (0.126"), 0.65 pbf (0.073").

CONTROL EXAMPLE B

| Wool | 15.20% |
| Cellulose | 13.60% |
| Perlite | 44.80% |
| Latex, 1st | 3.20% |
| Latex, 2nd | 3.20% |
| Dry Broke | 20.00% |

1.45 kilograms of the Example 1 BFG latex was made cationic by mixing with a 1.08% solution of DADMAC coagulant that contained 101.6 grams of DADMAC coagulant. 6.17 kilograms of cellulose was added to 153.05 liters of water and pulped for 1 hour, and to this was added the cationic latex. The resultant slurry was mixed in the pulper for 1 minute. An additional 1.45 kilograms of latex was added and mixed for 1 minute. 9.07 kilograms of pulped dry broke was added to the latex/newsprint slurry in a mix tank. To this was added approximately 1300 liters of water and mixed for 1 minute. To this was added 6.89 kilograms of mineral wool and 20.32 kilograms of 5 pcf (pound per cubic foot) perlite. Sufficient water was then added to achieve a total of 1518.2 liters of 3.0% slurry which was then mixed 10 minutes. A high charge, high molecular weight polyacrylamide flocculant was then added to the slurry as it was pumped to the Fourdrinier. The resultant composite board was formed using conventional processes, dried, and sanded. It was then NRC tested as a sanded, non-fabricated, board.

This board, at a 0.66 pbf density and a 0.845" thickness, had a NRC OF 0.682. The MOR was 81 psi. The density profile face to back was 0.60 pbf 0.152"), 0.58 pbf (0.158"), 0.63 pbf (0.157"), 0.65 pbf (0.155"), 0.64 pbf (0.125"), 0.72 pbf 0.128").

We claim:

1. A process for manufacturing a composite board product having a thickness of at least 0.5 inch and consisting essentially of up to 87% mineral wool, 5-75% perlite, 4-35% by weight cellulose fibers, 0-25% clay, and 2-15% by weight of a latex binder composition which comprises mixing the components with water to form an aqueous slurry; feeding said slurry into an initial zone; retaining said formed slurry in said zone without any further treatment for a time sufficient for turbulence to cease and for said cellulose fibers to disperse substantially uniformly throughout the thickness of said slurry; and, immediately thereafter, transferring said slurry to the final forming zone wherein the formed material is drained of liquid and pressed into the shape of said product having a thickness of at least 0.5 inch; and heating to solidify said product.

2. A process as in claim 1 wherein said initial zone is in the shape of a mold and said slurry is retained therein for at least 10 seconds.

3. A process as in claim 1 wherein said product contains up to 45% mineral wool and 40-75% perlite.

4. A process as in claim 1 wherein said slurry is retained in said initial zone for at least 20 seconds.

5. A composite board having a thickness of at least 0.5 inch consisting essentially of up to 87% by weight mineral wool, 5-85% by weight perlite, 0-25% by weight clay, 4-35% by weight cellulosic fibers, and 2-15% by weight of a binder composition comprising at least one thermoplastic polymer having a glass transition temperature of from 80° C. to 115° C., wherein the cellulose fibers in said board are substantially completely coated with said binder composition, said board displaying a density profile difference from front to back of less than about 0.05 pound per board foot and a noise resistance coefficient of at least 0.60.

6. The composite board of claim 5 comprising up to 45% mineral wool and 40-75% perlite.

7. A composite board of claim 5 having a thickness of 0.75-2.5 inches.

8. A process for manufacturing a composite board product having a thickness of at least 0.5 inch and consisting essentially of up to 87% mineral wool, 5-75% perlite, 4-35% by weight cellulose fibers, 0-25% clay, and 2-15% by weight of a binder composition which comprises mixing the components with water to form an aqueous slurry; feeding said slurry into an initial zone; retaining said formed slurry in said zone without any further treatment for a time sufficient for any turbulence to cease and for said cellulose fibers to disperse substantially uniformly throughout the thickness of said slurry; and, immediately thereafter, transferring said slurry to the final forming zone wherein the formed material is drained of liquid and pressed into the shape of said product having a thickness of at least 0.5 inch; and heating to solidify said product.

9. A composite board having a thickness of at least 0.5 inch consisting essentially of up to 87% by weight mineral wool, 5-85% by weight perlite, 0-25% by weight clay, 4-35% by weight of cellulosic fibers, and 2-15% by weight of a binder composition, said board displaying a density profile difference from front to back of less than about 0.05 pound per board foot and a noise resistance coefficient of at least 0.60.

* * * * *